(12) United States Patent
Fujii et al.

(10) Patent No.: US 8,310,811 B2
(45) Date of Patent: Nov. 13, 2012

(54) POSITIVE ELECTRODE ACTIVE MATERIAL FOR LITHIUM ION ELECTRIC STORAGE DEVICE, AND LITHIUM ION ELECTRIC STORAGE DEVICE USING THE SAME

(75) Inventors: Tsutomu Fujii, Tokyo (JP); Osamu Hatozaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 421 days.

(21) Appl. No.: 12/623,106

(22) Filed: Nov. 20, 2009

(65) Prior Publication Data
US 2010/0142121 A1 Jun. 10, 2010

(30) Foreign Application Priority Data
Dec. 5, 2008 (JP) .................................. 2008-311508

(51) Int. Cl.
*H01G 9/00* (2006.01)
*H01M 4/88* (2006.01)
(52) U.S. Cl. ..................................... 361/502; 252/182.1
(58) Field of Classification Search .................. 361/502; 252/182.1
See application file for complete search history.

(56) References Cited

FOREIGN PATENT DOCUMENTS
JP 2000007316 A * 1/2000
JP 2006-286923 A 10/2006
* cited by examiner

*Primary Examiner* — Jayprakash N Gandhi
*Assistant Examiner* — Arun Ramaswamy
(74) *Attorney, Agent, or Firm* — McDermott Will & Emery LLP

(57) ABSTRACT

[Problem] The present invention aims to enhance a characteristic of a lithium ion electric storage device upon charging or discharging with high load, and increasing a working temperature range thereof.
[Means for Solving Problem] In a positive electrode active material used for a lithium ion electric storage device, the BET specific surface area is 1500 $m^2/g$ or more and 3000 $m^2/g$ or less, the ratio A of the pore volume within the range of the pore diameter of 0.6 nm or more and less than 1 nm to the pore volume within the range of the pore diameter of 0.6 nm or more and 200 nm or less in the active material satisfies $0 \leq A \leq 0.80$, and the ratio B of the active material of the pore volume within the range of the pore diameter of 1 nm or more and 6 nm or less to the pore volume within the range of the pore diameter of 0.6 nm or more and 200 nm or less in the active material satisfies $0.20 \leq B \leq 1.0$. By virtue of this structure, the lithium ion electric storage device can be provided that is excellent in the charging/discharging characteristic when it is given a high load, and that can satisfactorily operate even under an environment of $-30°$ C.

5 Claims, 5 Drawing Sheets

Pore characteristic of activated carbon

|  | BET specific surface area m²/g | Total pore volume cc/g | Pore volume ratio A | Pore volume ratio B | Pore volume ratio C |
|---|---|---|---|---|---|
| Example 1/ activated carbon a | 1985 | 1.21 | 0.702 | 0.204 | 0.917 |
| Example 2/ activated carbon b | 2446 | 1.62 | 0.486 | 0.384 | 0.896 |
| Example 3/ activated carbon c | 2400 | 1.49 | 0.579 | 0.303 | 0.900 |
| Comparative Example 1/ activated carbon d | 1775 | 0.96 | 0.788 | 0.117 | 0.911 |
| Comparative Example 2/ activated carbon e | 2281 | 1.10 | 0.828 | 0.103 | 0.937 |

FIG. 3

Discharging load characteristic at 25°C

FIG. 4

Charging load characteristic at 25°C

FIG. 5

High-load characteristics of LIC at 25°C

| | Charging/dischar ging capacity (D) with low load/mAh | Discharging capacity (E) with high load/mAh | Charging capacity (F) with high load/mAh | Discharging capacity ratio (E/D) | Charging capacity ratio (F/D) | High-load charging/discha rging capacity ratio (F/E) |
|---|---|---|---|---|---|---|
| Example 1/LIC a | 8.19 | 4.31 | 4.15 | 0.526 | 0.507 | 0.963 |
| Example 2/LIC b | 8.43 | 4.67 | 4.45 | 0.554 | 0.528 | 0.953 |
| Example 3/LIC c | 7.47 | 4.18 | 4.03 | 0.560 | 0.539 | 0.964 |
| Comparative Example 1/LIC d | 6.24 | 2.49 | 1.61 | 0.399 | 0.258 | 0.647 |
| Comparative Example 2/LIC e | 7.22 | 2.78 | 2.15 | 0.385 | 0.298 | 0.773 |

FIG. 6

Discharging load characteristic at -30°C

FIG. 7

Charging load characteristic at -30°C

FIG. 8

Discharging load characteristic of LIC at -30°C

|  | Capacity at discharge of 0.06 A (G)/mAh | Capacity at discharge of 0.3 A (H)/mAh | Discharging capacity ratio H/G |
|---|---|---|---|
| Example 1/LIC a | 4.18 | 1.51 | 0.361 |
| Example 2/LIC b | 5.13 | 2.19 | 0.427 |
| Example 3/LIC c | 4.22 | 1.73 | 0.409 |
| Comparative Example 1/LIC d | 1.08 | 0.12 | 0.109 |
| Comparative Example 2/LIC e | 2.03 | 0.51 | 0.254 |

FIG. 9

Charging load characteristic of LIC at -30°C

|  | Capacity at charge of 0.06 A (I)/mAh | Capacity at charge of 0.3 A (J)/mAh | Capacity ratio (J/I) | High-load charging/ discharging capacity ratio J/H |
|---|---|---|---|---|
| Example 1/LIC a | 3.25 | 0.51 | 0.157 | 0.338 |
| Example 2/LIC b | 4.98 | 1.68 | 0.337 | 0.767 |
| Example 3/LIC c | 4.20 | 1.04 | 0.248 | 0.601 |
| Comparative Example 1/LIC d | 0.19 | 0.03 | 0.158 | 0.250 |
| Comparative Example 2/LIC e | 1.16 | 0.10 | 0.088 | 0.196 |

POSITIVE ELECTRODE ACTIVE MATERIAL FOR LITHIUM ION ELECTRIC STORAGE DEVICE, AND LITHIUM ION ELECTRIC STORAGE DEVICE USING THE SAME

CROSS-REFERENCE TO RELATED APPLICATIONS

The disclosure of Japanese Patent Application No. 2008-311508 filed on Dec. 5, 2008 including the specification, drawings and abstract is incorporated herein by reference in its entirety.

BACKGROUND OF THE INVENTION

1. Field of the Invention

The present invention relates to a technique of an electric storage device, and more particularly, it is well adaptable to a positive electrode of a lithium ion electric storage device.

2. Description of the Related Art

The technique described below has been studied for completing the present invention. The summary is as follows.

In recent years, the environmental issue, particularly the vehicle-exhaust gas emission, is widely talked about. In this situation, efforts are made of developing environment-friendly electric vehicles and the like. In the electric vehicle development, the strong development effort is focused on the electric storage device to be used as a power source. Many types of electric storage devices have been proposed for replacement of the conventional lead battery. Among these electric storage devices, an electric double layer capacitor, which is excellent in rapid regeneration capability of energy, is now attracting attention as a technique capable of being reducing an amount of $CO_2$ exhaust emission with the efficient use of energy. However, the electric double layer capacitor has a problem in the energy density. Therefore, an electric double layer capacitor having more than 10 Wh/kg has not yet been put to practical use.

A lithium ion capacitor described below has been proposed in order to overcome the drawback of the electric double layer capacitor. In the lithium ion capacitor described above, an activated carbon is used for the positive electrode, a carbon material that can storage and desorb lithium ions is used for the negative electrode, aprotic organic electrolytic solution containing lithium salt is used for the electrolytic solution, and lithium ions are pre-doped into the positive electrode and/or negative electrode so as to increase voltage. The lithium ion capacitor described above has an energy density exceeding 10 Wh/kg, and has a high output density and cycle characteristic equal to or more than those of the electric double layer capacitor. A further research and development have been made.

For example, there has been proposed, in the Japanese Unexamined Patent Publication No. 2006-286923, that a technique in which an activated carbon grain described below is used as a positive electrode active material of a lithium ion capacitor. In the activated carbon grain, the pore volume of a pore radius within the range of 0.1 to 4 nm is 80% or more of the total pore volume, and the total pore volume falls within the range of 0.4 to 1.5 cc/g. The Patent Document 1 describes that, when this structure is employed, the energy density and the output density of the lithium ion capacitor can further be enhanced.

As described above, a further study has been made in which the property of the electrode is enhanced by limiting the pore volume of the active material, which constitutes the electrode, to a specific range. However, the pore volume described in the Patent Document 1 is specified within a very wide range. Specifically, if the pore volume of a pore radius within the range of 0.1 to 4 nm is 80% or more of the total pore volume, activated carbons outside the specified range are hardly present in the world.

When an activated carbon is used as the electrode material of the electric double layer capacitor, it is preferable that an activated carbon having a specific surface area of 1500 m²/g or more for exhibiting high capacitance is used. However, when the specific surface area is not less than 1500 m²/g, the pore volume of the general activated carbon becomes 0.4 cc/g or more in general. Specifically, it falls within the range of 0.4-1.5 cc/g of the total pore volume, which is specified in the Patent Document 1.

As described above, the pore volumes of the activated carbons having the specified range in the Patent Document 1 are mostly overlapped with the pore volumes of known activated carbons. Therefore, it is considered that the intended effect cannot be obtained. It is desired that a positive electrode active material of a lithium ion capacitor excellent in input/output characteristic can reversibly and promptly adsorb and desorb anions and lithium ions. It is conceived that the activated carbon having a wide specified range active material described above cannot afford the expected high output density. Further, within the described range of the pore diameter, it is considered that satisfactory characteristic in the load characteristic at low temperature, particularly at the input side, cannot be obtained.

An object of the present invention is to provide a technique of enhancing a characteristic of a lithium ion electric storage device upon charging or discharging with high load, and increasing a working temperature range thereof.

The foregoing and other objects and novel features of the present invention will be apparent from the description of the specification of the present application and the attached drawings.

SUMMARY OF THE INVENTION

The summary of the representative invention, among the inventions described in the present application, will be explained below. Specifically, an active material used for a positive electrode of a lithium ion electric storage device has a BET specific surface area of 1500 m²/g or more and 3000 m²/g or less, a ratio A of the pore volume within the range of the pore diameter of 0.6 nm or more and less than 1 nm to the pore volume within the range of the pore diameter of 0.6 nm or more and 200 nm or less in the active material is limited to $0 \leq A \leq 0.80$, and a ratio B of the pore volume within the range of the pore diameter of 1 nm or more and 6 nm or less to the pore volume within the range of the pore diameter of 0.6 nm or more and 200 nm or less in the active material is limited to $0.20 \leq B \leq 1.0$.

The effect obtained by the representative invention will briefly be described below. Specifically, the BET specific surface area of the activated carbon contained in the positive electrode active material, the ratio of the active material of the pore volume within the range of the pore diameter of 0.6 nm or more and less than 1 nm to the pore volume within the range of the pore diameter of 0.6 nm or more and 200 nm or less, and the ratio of the active material of the pore volume within the range of the pore diameter of 1 nm or more and 6 nm or less to the pore volume within the range of the pore diameter of 0.6 nm or more and 200 nm or less are specified. By virtue of this, an increased capacity can be obtained upon charging or discharging with high load. Further, the charging/discharging characteristic at low temperature, particularly charging characteristic, can remarkably be enhanced. Specifically, the present invention can provide a lithium ion electric storage device that is excellent in the charging/discharging characteristic when it is given a high load, has a wide working temperature range, and can retain a satisfactory property even under an environment of −30° C.

DETAILED DESCRIPTION OF THE PREFERRED EMBODIMENTS

An embodiment of the present invention will be explained in detail below with reference to the drawings. The present invention relates to a technique relating to a positive electrode active material of a lithium ion electric storage device. particularly, the present invention is well adaptable to an electric storage device to which lithium ions are pre-doped. Examples of the electric storage device include a lithium ion capacitor.

In the present specification, the term doping (dope) involves storage, support, adsorb or insert, and specifically a phenomenon where lithium ions and/or anions enter the positive electrode or lithium ions enter the negative electrode. The term de-doping (de-dope) involves release, desorb and detach, and specifically a phenomenon reverse to the doping phenomenon described above.

In the technique according to the present invention, the active material used for the positive electrode has a BET specific surface area of 1500 m²/g or more and 3000 m²/g or less. A ratio A of the pore volume within the range of the pore diameter of 0.6 nm or more and less than 1 nm to the pore volume within the range of the pore diameter of 0.6 nm or more and 200 nm or less in the active material satisfies $0 \leq A \leq 0.80$. A ratio B of the pore volume within the range of the pore diameter of 1 nm or more and 6 nm or less to the pore volume within the range of the pore diameter of 0.6 nm or more and 200 nm or less in the active material satisfies $0.20 \leq B \leq 1.0$.

The value of the specific surface area of 1500 m²/g or more and 3000 m²/g is a value calculated based upon a known BET method using a nitrogen adsorption isotherm. The pore volume within the range of the pore diameter of 0.6 nm or more and 2 nm or less is measured according to a known MP method, while the pore volume within the range of the pore diameter of 2 nm or more and 200 nm or less is measured according to a known DH method.

Since the present invention has the structure described above, it can improve the property of the lithium ion electric storage device using the positive electrode active material. For example, the lithium ion electric storage device according to the present invention can attain increased capacity upon charging or discharging with high load. Further, the present invention can remarkably improve the charging/discharging characteristic, especially, the charging characteristic, at low temperature. Specifically, the lithium ion electric storage device according to the present invention is excellent in the charging/discharging characteristic when it is given a high load, has a wide working temperature range, and can retain a satisfactory property even under an environment of −30° C.

The present invention will be described on the basis of the difference between the present invention and the conventional technique described above. The structure of the present invention will be well understood through the description below. In a positive electrode of a lithium ion capacitor using the principle of an electric double layer, the adaptability between the pore size of an activated carbon, which is the positive electrode active material, and an anion size and between the pore size and a size of a solvated lithium ion is important in order to enhance the input/output density of the positive electrode. In view of this, the present inventors have studied in detail the adaptability between anion size and a pore size. The present invention aims to surely enhance the input/output density of the lithium ion capacitor by specifying the pore characteristic of the used activated carbon within a specific range. In particular, the present invention can enhance the input/output characteristic at low temperature.

Embodiment 1

In the present embodiment, the positive electrode active material according to the present invention used for a lithium ion electric storage device will be described. It is important that the positive electrode active material has a BET specific surface area of 1500 m²/g or more and 3000 m²/g or less. More preferably, the BET specific surface area is 1900 m²/g or more and 2700 m²/g or less. When the BET specific surface area is less than 1500 m²/g, the obtained capacitance of the active material per unit weight is reduced, since the specific surface area is small. Because of the unsatisfactory effect described above, the specific surface area is specified to be 1500 m²/g or more. Even if the BET specific surface area exceeds 3000 m²/g, the capacitance per a volume of the electrode is reduced due to the reduction in the electrode density. Because of the unsatisfactory effect described above, the upper limit of the BET specific surface area is specified to be 3000 m²/g.

In the positive electrode active material having the BET specific surface area of 1500 m²/g or more and 3000 m²/g or less, it is desired that the ratios A and B of the pore volume within the range of the pore diameter of 0.6 nm or more and less than 1 nm and within the range of the pore diameter of 1 nm or more and 6 nm or less necessarily fall within the predetermined ranges. Specifically, it is necessary that the ratio A of the pore volume within the range of the pore diameter of 0.6 nm or more and less than 1 nm to the pore volume within the range of the pore diameter of 0.6 nm or more and 200 nm or less in the active material satisfies $0 \leq A \leq 0.80$, and the ratio B of the pore volume within the range of the pore diameter of 1 nm or more and 6 nm or less to the pore volume within the range of the pore diameter of 0.6 nm or more and 200 nm or less in the active material satisfies $0.20 \leq B \leq 1.0$.

The lower limit of the range of A may be 0%, but the upper limit has to be 80% or less. The reason is as follows. When the range of A exceeds 80% in the case of the potential of the positive electrode being 3 V (vs. Li/Li+) or lower, the problem might occur in which the charging/discharging characteristic of 3V (vs. Li/Li+) or lower is reduced since the reduction in the speed of adsorbing and desorbing the solvated lithium ions on the surface of the positive electrode active material. Particularly, it is considered that the charging characteristic, especially a rapid charging characteristic with high-load current, is deteriorated. More preferably, the range A is 70% or less. Specifically, the preferable range is $0 \leq A \leq 0.70$. The reason of this is as follows. Specifically, if the upper limit is set to be 70%, the effect can more stably and remarkably be felt than in the case where the upper limit is set to be 80%.

The upper limit of the range of B may be 100%, but the lower limit has to be 20%. The range of B being less than 20% means that the ratio of the pore volume within the range of the pore diameter of 0.6 nm or more and less than 1 nm to the pore volume within the range of the pore diameter of 0.6 nm or more and 200 nm or less, or the ratio of the pore volume within the range of the pore diameter of 6 nm or more and 200 nm or less to the pore volume within the range of the pore diameter of 0.6 nm or more and 200 nm or less, increases. The problem caused by the increase in the ratio of the pore volume within the range of the pore diameter of 0.6 nm or more and less than 1 nm to the pore volume within the range of the pore diameter of 0.6 nm or more and 200 nm or less is as described above.

The problem is not caused in the rapid charging characteristic, which is a matter of concern as described above, due to the increase in the ratio of the pore volume within the range of the pore diameter of 6 nm or more and 200 nm or less to the pore volume within the range of the pore diameter of 0.6 nm or more and 200 nm or less. However, the increase described above causes the reduction in the capacitance per a volume of an electrode due to the reduction in the electrode density, and also causes the resultant capacitance since the specific surface area, which is effective for forming the electric double layer, is difficult to increase. Thus, the increase described above is non-preferable. The range of the B described above is more preferably 30% or more. Specifically, the preferable range is $0.30 \leq B \leq 1.0$. The reason of this is as follows. Specifically, if the lower limit is set to be 30%, the effect can more stably and remarkably be felt than in the case where the lower limit is set to be 20%.

In the range of the pore diameter of 1 nm or more and 6 nm or less specified by the present invention, the pore present in this range is preferably distributed in the pore size of 1.5 nm or more. This is based on the reason described below. Specifically, since the stokes diameter of a lithium ion, which is solvated by propylene carbonate, is 1.4 nm, the mobility of the solvated lithium ion in the pore is enhanced by introducing more pores, having the size of 1.5 nm or more, into an activated carbon. As a result, the enhancement in the rapid charging characteristic can more remarkably be felt. More preferably, the pore size is 4 nm or more.

The reason why it is necessary that the BET specific surface area is limited to the range described above, and that the ratios A and B of the pore volume within the range of the pore diameter of 0.6 nm or more and less than 1 nm and the pore volume within the range of the pore diameter of 1 nm or more and 6 nm or less to the pore volume within the range of the pore diameter of 0.6 nm or more and 200 nm or less fall within the range described above is as follows. Specifically, if either one of the factors is not achieved, a problem is caused in which it is difficult to obtain a greater capacity in the charging/discharging during the application of high-load current.

Examples of the activated carbon that can be used for the positive electrode active material specified above include a coke-based activated carbon derived from cokes subject to an activation treatment, a coconut husk based activated carbon such as a coconut husk activated carbon subject to the activation treatment, or a phenol-based activated carbon such as a phenolic activated carbon subject to the activation treatment. Examples of the activation treatment include an alkali activation treatment using an alkali catalyst such as sodium hydroxide or potassium hydroxide, or a steam activation treatment.

Embodiment 2

In the present embodiment, the lithium ion electric storage device using the positive electrode active material described in the embodiment above will be described. The electric storage device can be configured as a lithium ion capacitor, for example.

Figure 1:
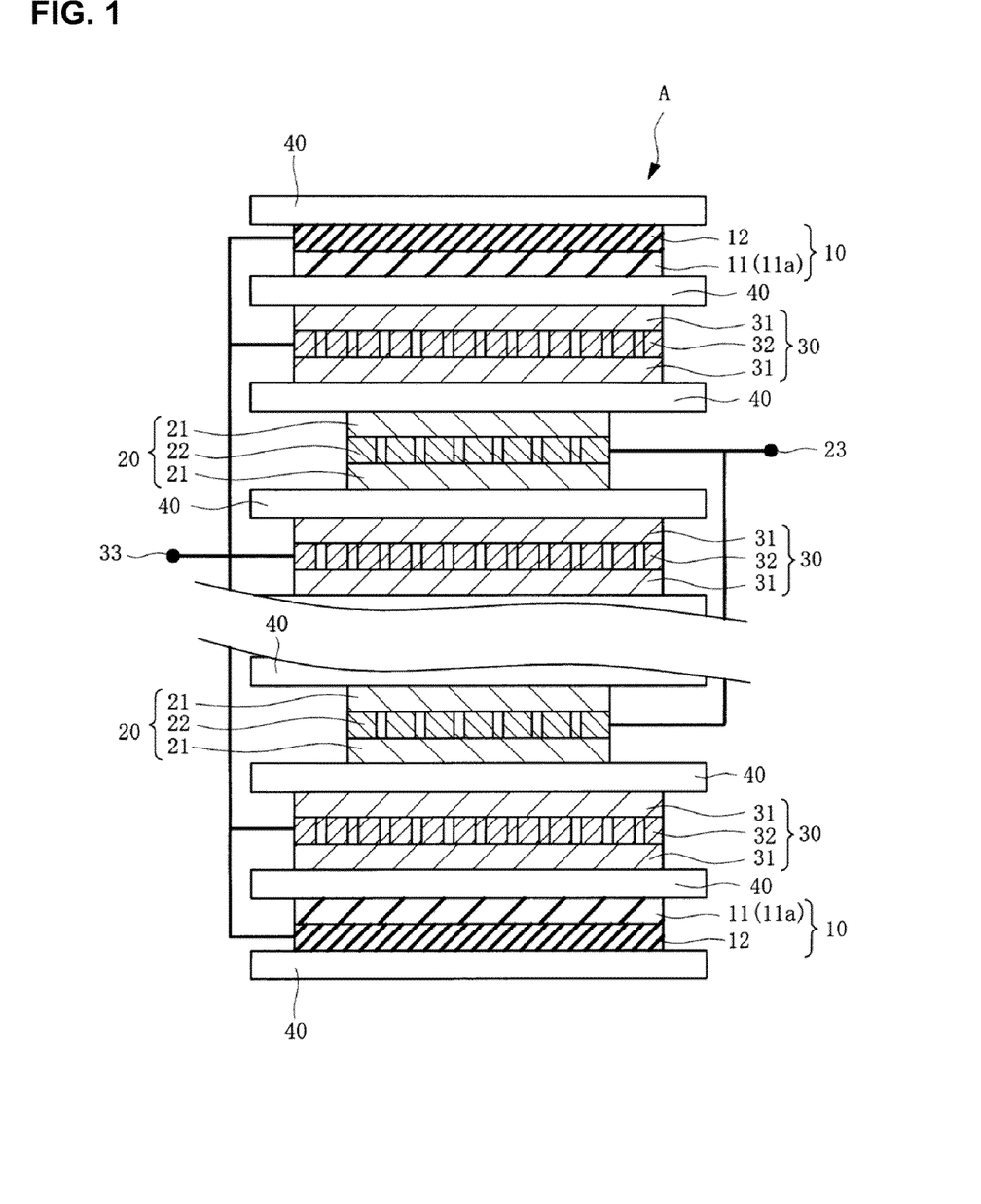
FIG. 1 is a schematic diagram illustrating a configuration of a lithium ion electric storage device according to the present invention.

FIG. 1 schematically illustrates an electrode structure when the lithium ion electric storage device is configured as a lithium ion capacitor. As illustrated in FIG. 1, for example, the electric storage device is configured as a stacked-type lithium ion capacitor A. The lithium ion capacitor A includes lithium electrodes 10, positive electrodes 20, and negative electrodes 30. A plurality of positive electrodes 20 and negative electrodes 30 are alternately stacked in a state that a separator 40 is interposed between each of the positive electrodes 20 and each of the negative electrodes 30. The negative electrode 30 is arranged at the outermost part of the stacked structure. The lithium electrode 10 is provided so as to be opposite to the negative electrode 30 arranged at the outermost part of the stacked structure through the separator 40. Thus, the stacked unit is formed. Although not illustrated, the stacked unit described above is impregnated into electrolytic solution.

As illustrated in FIG. 1, each of the lithium electrodes 10 has, for example, a metal lithium 11a serving as a lithium ion source 11 mounted on a current collector 12 with a predetermined thickness. Each of the positive electrodes 20 has a positive electrode mixture material 21 formed on a current collector 22 with a predetermined thickness. Each of the negative electrodes 30 also has a negative electrode mixture material 31 formed on a current collector 32 with a predetermined thickness. The current collectors 22 and 32 are porous members having holes passing from the front to the reverse side thereof as illustrated in FIG. 1.

A positive electrode terminal 23 is provided at each of the positive electrodes 20 so as to extend from the current collector 22. A negative electrode terminal 33 is provided at each of the negative electrodes 30 so as to extend from the current collector 32. When the lithium ion capacitor A that is the electric storage device is used, the positive electrode terminal 23 and the negative electrode terminal 33 are used. Thus, the lithium ion capacitor A, which is a stacked-type unit including the positive electrodes 20 and the negative electrodes 30, is formed. The term "positive electrode" means an electrode from which current flows out when the lithium ion capacitor is discharged, and the term "negative electrode" means an electrode to which current flows in when the lithium ion capacitor is discharged.

The lithium ion capacitor A thus configured is put into a package, which is an outer casing made of a laminate film, for example, whereby it becomes a product. Before being made as a product, the lithium ion capacitor A is pre-doped with lithium ions. Specifically, the lithium ion capacitor is pre-doped during the assembling process thereof. The pre-doping is executed between the lithium electrodes 10 and the negative electrodes 30. The lithium ion capacitor is shipped as a product with the lithium ions doped in advance into the negative electrodes 30.

It is preferable to dope the negative electrode with lithium ions so that after the positive electrode and the negative electrode are short-circuited, the potential of the positive electrode is 2 V (vs. Li/Li+) or lower, for example. With this, the utilized capacity of the positive electrode increases to thereby enhance the energy density.

The wording "the potential of the positive electrode after short-circuiting between the positive electrode and the negative electrode is 2V (vs. Li/Li+) or lower" means that the potential of the positive electrode, which is obtained by either of the following methods, is 2V (vs. Li/Li+) or lower. The first method is as follows. After the doping of lithium ions, the positive electrode terminal and the negative electrode terminal of a cell of the lithium ion capacitor are directly connected by a conductor to be short-circuited. This short-circuiting state is left to stand for 12 hours or longer. Thereafter, the short-circuiting state is canceled and the potential of the positive electrode measured within a time range from 0.5 to 1.5 hours from the cancellation is 2V (vs. Li/Li+) or lower.

The second method is as follows. By using a charging/discharging apparatus, the capacitor is discharged to 0 V at a constant current for 12 hours or longer. Then, the positive electrode terminal and the negative electrode terminal are coupled together by means of a conductor to be short-circuited. In this state, the capacitor is left to stand for 12 hours or longer and the short-circuiting of those electrodes is canceled. The potential of the positive electrode measured within a time range from 0.5 to 1.5 hours from the cancellation is 2V (vs. Li/Li+) or lower.

Generally, the upper limit of the charging voltage is determined by such a voltage as not to cause the decomposition of the electrolytic solution owing to the increase of the positive electrode potential. When the positive electrode potential is set at the upper limit, the charging voltage can be increased by the decrease of the negative electrode potential. If the potential of the positive electrode after short-circuiting is lowered to be 3 V (vs. Li/Li+) or lower, preferably 2 V (vs. Li/Li+) or lower, the utilized capacity of the positive electrode increases by the potential decrease and the capacity of the capacitor becomes high.

In a so-called hybrid capacitor, activated carbon is used for a positive electrode and carbon material such as graphite or non-graphitizable carbon, which is used in a lithium ion secondary battery, is used for a negative electrode. In such a hybrid capacitor, the activated carbon or the carbon material has usually a potential at 3 V (vs. Li/Li+) or thereabout. Therefore, even if the terminals of the positive electrode and the negative electrode are short-circuited, the potential at about 3 V (vs. Li/Li+) of the positive electrode remains unchanged. On the basis of those facts, in the lithium ion capacitor according to the present invention, the potential of the positive electrode is lowered to 2 V (vs. Li/Li+) or lower when the electrodes are short-circuited by doping the negative electrode with lithium ions, which are supplied from a lithium ion source, e.g., metal lithium, which is separately provided.

This means the negative electrode of the cell of the lithium ion capacitor is doped, in advance, with lithium ions supplied from the lithium electrode. With the pre-doping of the lithium ions, the potential of the positive electrode is lowered to be 2 V (vs. Li/Li+) or lower after the positive electrode and the negative electrode are short-circuited.

One or both of the negative electrode and the positive electrode may be doped with the lithium ions. In this case, when the potential of the positive electrode is excessively lowered by increasing the doping amount of lithium ions, problems sometimes arise. For example, the lithium ions are irreversibly consumed and the cell capacity lowers. Accordingly, it is necessary to control the doping amounts of lithium ions at the negative electrode and the positive electrode so as not to cause such a problem. The controlling of the doping amounts of the lithium ions at the electrodes makes the cell forming process complicated. To avoid this, the lithium ions are preferably doped only into the negative electrode. The lithium ion capacitor according to the present invention realizes this structure.

It is preferable that the capacitance of the negative electrode per unit weight is not less than three times as large as the capacitance of the positive electrode per unit weight. Further, it is preferable that the weight of the positive electrode active material is larger than that of the negative electrode active material. By so selecting the capacitance and the weight, the lithium ion capacitor of high voltage and high capacity is obtained. As just mentioned, it is preferable that the weight of the positive electrode active material is larger than that of the negative electrode active material.

In the lithium ion capacitor A thus formed, the positive electrode 20 includes the positive electrode active material described in the embodiment. Specifically, the positive electrode active material described in the embodiment is contained in the positive electrode mixture material 21 formed on the current collector 22 for the positive electrode. The positive electrode active material is the activated carbon. For example, a coconut husk activated carbon subject to the alkali activation treatment can be used as the positive electrode active material.

In the coconut husk activated carbon, the BET specific surface area is specified to be 1500 $m^2/g$ or more and 3000 $m^2/g$ or less. The ratio A of the pore volume within the range of the pore diameter of 0.6 nm or more and less than 1 nm to the pore volume within the range of the pore diameter of 0.6 nm or more and 200 nm or less in the coconut husk activated carbon satisfies $0 \leq A \leq 0.80$. The ratio B of the pore volume within the range of the pore diameter of 1 nm or more and 6 nm or less to the pore volume within the range of the pore diameter of 0.6 nm or more and 200 nm or less in the coconut husk activated carbon satisfies $0.20 \leq B \leq 1.0$.

On the other hand, graphite, carbon material, polyacene-based material, etc. can be used as the active material of the negative electrode 30. Examples of the carbon material include non-graphitizable carbon material, etc. Examples of the polyacene-based material include PAS that is an insoluble and infusible base and has a polyacene skeletal structure. The negative electrode active materials allow lithium ions to be reversibly doped.

The constituent of the positive electrode mixture material and the negative electrode mixture material described above further includes a binder. Examples of the binder include a rubber-based binder, a fluorine-containing resin, a thermoplastic resin, and an acrylic resin. Examples of the rubber-based binder include SBR or NBR that is a diene polymer. Examples of the fluorine-containing resin may include polytetrafluoroethylene (PTFE), polyvinylidene fluoride (PVdF), etc. Examples of the thermoplastic resin may include polypropylene, polyethylene, etc. Examples of the acrylic resin may include acrylic acid 2-ethylhexyl, and a copolymer of methacrylic acid, acrylonitrile, and ethylene glocol dimethacrylate.

Examples of the conductive material, which is used in the negative electrode mixture material and the positive electrode mixture material, include a carbon black such as acetylene black or ketjen black, and a conductive carbon material such as a carbon fiber, expanded graphite, carbon nanotube, etc. The negative electrode mixture material and the positive electrode mixture material may include carboxylmethyl cellulose (CMC) as a thickener.

The above-mentioned active materials, binder, and if necessary, conductive material or thickener are dispersed into a water or an organic solvent such as N-methyl-2-pyrrolidone to obtain a slurry. The negative electrode mixture material and the positive electrode mixture material, which are formed into the slurry, are coated over the perforated current collector with a predetermined thickness. The positive electrode mixture material and the negative electrode mixture material may be coated with the use of a coating apparatus such as a die coater or comma coater. The mixture material layer coated over the current collector with a predetermined thickness is dried for 12 hours under the temperature of 150 to 200° C. in a vacuum, although depending upon the heat resistance of the binder, whereby the electrode is formed.

The negative electrodes and the positive electrodes thus formed are provided through the electrolytic solution. An electrolyte is dissolved in the electrolytic solution. In the case of the lithium ion capacitor, the electrolytic solution can be made of aprotic polar solvent. The aprotic polar solvent forms aprotic organic electrolytic solution. Examples of the aprotic organic solvent include ethylene carbonate, propylene carbonate, dimethyl carbonate, ethyl methyl carbonate, diethyl carbonate, g-butyloractone, acetonitrile, dimethoxyethane, tetrahydrofuran, dioxolane, methylene chloride, sulfolane, etc.

In addition, a mixed solvent having at least two types of these aprotic polar solvents can be used. From the viewpoint of relative permittivity contributing to the charging/discharging characteristic, a freezing point and boiling point contributing to the temperature range in which the electric storage device can operate, and a burning point contributing to safety, propylene carbonate is preferably used. However, when a graphite is used for the active material of the negative electrode, ethylene carbonate is preferably used as a substitute for the propylene carbonate, since the propylene carbonate is decomposed on the graphite at the potential of about 0.8 V (vs. Li/Li+) of the negative electrode. The melting point of ethylene carbonate is 36° C., so that it is solid at room temperature. Therefore, when the ethylene carbonate is used as the solvent of the electrolytic solution, it has to be mixed with the aprotic polar solvent other than ethylene carbonate in order to make the ethylene carbonate liquid at room temperature.

An aprotic polar solvent having low viscosity and low freezing point is preferably selected for the aprotic polar solvent used with the ethylene carbonate, from the viewpoint of charging/discharging characteristic and the temperature range in which the electric storage device can operate. However, the electrolytic solution containing ethylene carbonate causes a sharp reduction in ion conductivity due to the freeze of the ethylene carbonate, when the ambient temperature becomes about −10° C. or lower. Therefore, the low-temperature characteristic is likely to deteriorate.

Accordingly, as described in the Example, it is desirable to use propylene carbonate for the aprotic polar solvent of the electrolytic solution in order to obtain an electric storage device having satisfactory property even under the environment of −30° C., which is the effect of the invention. Further, the material having low reductive decomposition characteristic of propylene carbonate is desirably used for the active material of the negative electrode.

An electrolyte to be dissolved in the electrolytic solution may be any type of electrolytes as long as it is able to generate lithium ions. Examples of the electrolyte include $LiClO_4$, $LiAsF_6$, $LiBF_4$, $LiPF_6$, $LiN(C_2F_5SO_2)_2$, $LiN(CF_3SO_2)_2$, etc.

An additive agent such as vinylene carbonate is mostly used in recent years, since the property of the electric storage device is enhanced when it is added into the electrolytic solution. In the lithium ion capacitor according to the present invention, the additive agent may be added into the electrolytic solution.

A metal lithium or lithium-aluminum alloy, for example, may be used for the lithium electrode 10 as the lithium ion source for pre-doping the lithium ions into the negative electrode 30 at the initial charging. Specifically, the material that contains at least lithium elements and can supply lithium ions can be used.

A porous member or the like having durability with respect to the electrolytic solution, positive electrode active material, negative electrode active material, or the like, having through-holes and having no electron conductivity can be used for the separator formed between the negative electrode and the positive electrode and between the negative electrode and the lithium electrode. Generally, paper (cellulose), a cloth made of glass fiber, polyethylene, polypropylene, etc., non-woven fabric, or porous body is used. The thickness of the separator can appropriately be set considering the holding amount of the electrolytic solution, strength of the separator, or the like. The thickness of the separator is preferably thin in order to lower the internal resistance of the electric storage device.

The lithium ion capacitor formed into the stacked-type unit has been described above. However, the lithium ion capacitor may of course be formed into a single unit. The single unit includes a pair of positive electrode and negative electrode, which are formed to be opposite to each other. A single lithium electrode is provided with respect to the negative electrode. A separator is formed between the positive electrode and the negative electrode and between the negative electrode and the lithium electrode.

The lithium ion capacitor of the present invention may be formed into a wound type in which strip-like lithium, positive and negative electrodes are wound with a separator interposed between them. In the description above, the lithium electrode is provided to oppose to the negative electrode that is arranged at the outermost part of the stacked electrode structure. However, the lithium electrode may be formed so as to be sandwiched between the stacked electrode structure. The arrangement structure is basically free.

In FIG. 1, the porous current collector having holes passing from the front to the reverse side thereof is used for the current collectors 22 and 32. However, a current collector having no holes formed thereon may be used, although the pre-doping efficiency is reduced. FIG. 1 illustrates that the current collector 12 is not a perforated current collector. However, the perforated structure can be used for the current collector 12.

The positive electrode active material for the lithium ion electric storage device in which the BET specific surface area is 1500 $m^2/g$ or more and 3000 $m^2/g$ or less, the ratio A of the pore volume within the range of the pore diameter of 0.6 nm or more and less than 1 nm to the pore volume within the range of the pore diameter of 0.6 nm or more and 200 nm or less in the active material satisfies 0≦A≦0.80, and the ratio B of the active material of the pore volume within the range of the pore diameter of 1 nm or more and 6 nm or less to the pore volume within the range of the pore diameter of 0.6 nm or more and 200 nm or less in the active material satisfies 0.20≦B≦1.0, can be well adaptable to a product having mounted thereto an electric storage device such as an electric vehicle.

EXAMPLES

The Examples are conducted for verifying the effectiveness of the pre-doped lithium ion capacitor using the positive electrode active material, described in the above-mentioned embodiment, according to the present invention. In the lithium ion capacitor A described in the embodiment, the activated carbon is used in which the BET specific surface area is 1500 $m^2/g$ or more and 3000 $m^2/g$ or less, the ratio of the active material of the pore volume within the range of the pore diameter of 0.6 nm or more and less than 1 nm to the pore volume within the range of the pore diameter of 0.6 nm or more and 200 nm or less is 0% or more and 80% or less, and the ratio of the active material of the pore volume within the range of the pore diameter of 1 nm or more and 6 nm or less to the pore volume within the range of the pore diameter of 0.6 nm or more and 200 nm or less is 20% or more and 100% or less.

The lithium ion capacitor described above was formed as follows. Specifically, the ratio of the pore volume within the range of the pore diameter of 0.6 nm or more and less than 1 nm to the pore volume within the range of the pore diameter of 0.6 nm or more and 200 nm or less is defined as the pore volume ratio A. Further, the ratio of the pore volume within the range of the pore diameter of 1 nm or more and 6 nm or less to the pore volume within the range of the pore diameter of 0.6 nm or more and 200 nm or less is defined as the pore volume ratio B. The BET specific surface area of the active material having the pore volume ratios A and B falls within 1500 $m^2/g$ or more and 3000 $m^2/g$ or less.

Example 1

In the Example 1, a coal-based cokes was subject to the alkali activation to form activated carbon a having 70.2% of the pore volume ratio A and 20.4% of the pore volume ratio B. The activated carbon is fully washed to remove the residual ash and adjust pH. The activated carbon thus prepared was used as the positive electrode active material.

The positive electrode mixture material was prepared into a paste by thoroughly mixing 100 parts by weight of the positive electrode active material described above, 6 parts by weight of acetylene black, 4 parts by weight of carboxymethyl cellulose, and water. 6 parts by weight of an emulsion of acrylate rubber binder in the form of solid was added to the paste, whereby the coatable electrode coating agent of the positive electrode mixture material was prepared. Both surfaces of an aluminum foil having through-holes were coated with the electrode coating agent to thereby obtain a positive electrode.

On the other hand, a negative electrode was formed as described below. Specifically, Carbotron P(F)-S, which was manufactured by Kureha Corporation and which was non-graphitizable carbon, was used as the negative electrode active material. 88 parts by weight of the active material, 6 parts by weight of acetylene black (special pressed product HS-100) manufactured by Denki Kagaku Kogyo Kabushiki Kaisha, and 3 parts by weight of carboxymethyl cellulose were mixed with water so as to prepare a paste. 4 parts by weight of a latex of styrene butadiene rubber binder in the form of a solid was added to the paste to thereby prepare a negative electrode mixture material as an electrode coating agent. Both surfaces of a copper expanded metal having through-holes were coated with the negative electrode mixture material to thereby obtain a negative electrode.

The obtained positive electrode and the negative electrode were dried under reduced pressure. After being dried, the positive electrode and the negative electrode were cut into a predetermined size, and the resultants were stacked with a cellulose separator, having a thickness of 50 µm, interposed between each of the positive electrodes and each of the negative electrodes. Then, a positive electrode terminal and a negative electrode terminal were welded to the positive electrode and the negative electrode respectively. Next, a metal lithium was press-bonded to a stainless mesh to form a lithium electrode for pre-doping lithium ions. The lithium electrode thus formed was arranged at the outermost part of the electrode stacked unit, whereby a device of a lithium ion capacitor was formed.

The device of the lithium ion capacitor was covered by an aluminum laminate film, which was an outer casing, and then, three sides of the aluminum laminate film were heat-sealed. Thereafter, an electrolytic solution, which was prepared by dissolving LiPF6 at 1.2 mol/l into propylene carbonate, was injected into the aluminum laminate film. The resultant was subject to a vacuum-impregnating process, and then, the remaining one side of the aluminum laminate film was vacuum-sealed to assemble a cell of the lithium ion capacitor a. For the sake of convenience, the lithium ion capacitor is sometimes abbreviated to LIC in the figures. Upon forming the cell, the ratio of the weight of the positive electrode active material and the weight of the negative electrode active material was 0.863.

The obtained cell of the lithium ion capacitor was subject to a discharging operation between the negative electrode and the lithium electrode with the use of a charging/discharging apparatus in order that the potential of the negative electrode became 0.02 V (vs. Li/Li+) when a voltage of 3.8 V was applied to the cell. With this operation, lithium ions in a predetermined amount were electrochemically doped into the negative electrode. After the pre-dope of the lithium ions was completed, the positive electrode and the negative electrode were charged and discharged to acquire the charging/discharging characteristic of the lithium ion capacitor.

Example 2

In this Example 2, a coconut husk was subject to the alkali activation to obtain an activated carbon b serving as the positive electrode active material. A lithium ion capacitor b was formed in the same manner as in the Example 1 except for the process described above. The pore volume ratio A of this activated carbon was 48.6%, and the pore volume ratio B was 38.4%.

Example 3

In this Example 3, a coconut husk was subject to the alkali activation to obtain an activated carbon c serving as the positive electrode active material. A lithium ion capacitor c was formed in the same manner as in the Example 1 except for the process described above. The pore volume ratio A of this activated carbon was 57.9%, and the pore volume ratio B was 30.3%.

Comparative Example 1

As the Comparative Example 1, a coconut husk was subject to the alkali activation to obtain an activated carbon d serving as the positive electrode active material. A lithium ion capacitor d was formed by using this activated carbon d. The lithium ion capacitor d was formed in the same manner as in the Example 1 except for the use of the activated carbon d. The pore volume ratio A of this activated carbon was 78.8%, and the pore volume ratio B was 11.7%.

Comparative Example 2

In this Comparative Example 2, a phenolic resin was subject to the alkali activation to obtain an activated carbon e serving as the positive electrode active material. A lithium ion capacitor e was formed in the same manner as in the Example 1 except that the positive electrode was formed by using the activated carbon e. The pore volume ratio A of this activated carbon was 82.8%, and the pore volume ratio B was 10.3%.

Figure 2:
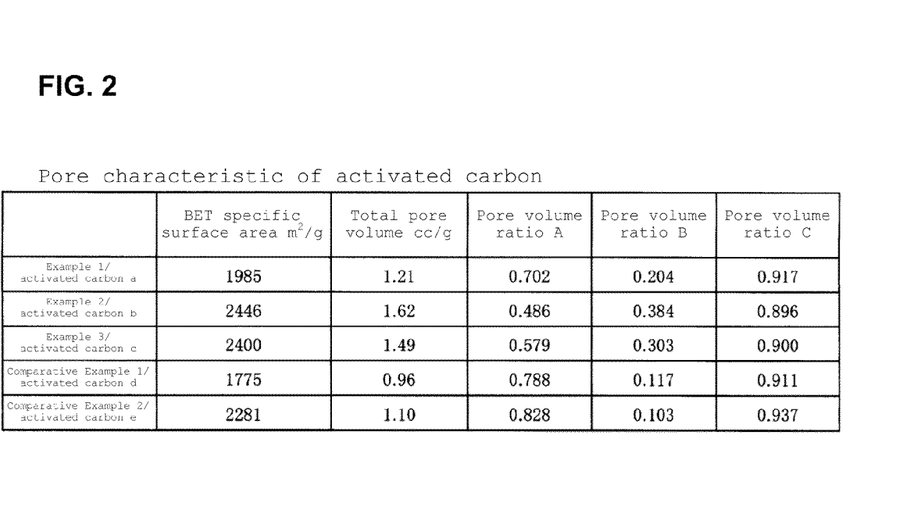
FIG. 2 is a table illustrating pore characteristics of activated carbons used for a positive electrode in the lithium ion capacitor in the Examples.

FIG. 2 shows the BET specific surface areas, the pore volumes (total pore volume) within the range of 0.6 to 200 nm, pore volume ratio A, and pore volume ratio B of the activated carbons used for the lithium ion capacitors in the Examples 1 to 3 and Comparative Examples 1 and 2. FIG. 2 also shows the pore volume ratio C, which is a ratio of pore volume within the range of the pore diameter of 0.2 to 8 nm to the total pore volume, the ratio defined in the Patent Document 1.

The pore volume ratio C of the activated carbon used for the evaluation in the present Examples falls within the range described in the Patent Document 1. The total pore volume falls within the range of 0.4 to 1.5 g/cc described in the Patent Document 1, except for the Example 2.

The lithium ion capacitor thus formed was charged at a constant current of 0.2 A till the cell voltage reached 3.6 V, and then a constant voltage of 3.6 V was applied. The constant current-constant voltage charging method described above was performed for 30 minutes under the ambient temperature of 25° C. Then, the capacitor was discharged at a constant current of 0.2 A till the cell voltage reached 2.2 V, whereby a discharging characteristic with a low load was acquired. Then, the constant current-constant voltage charging method was performed under the charging condition same as that described above. The capacitor was repeatedly discharged till the voltage reached 2.2 V, while changing the current value. As a result, a discharging load characteristic was acquired.

The capacitor whose discharging characteristic was acquired was discharged at a constant current of 0.2 A till the cell voltage reached 2.2 V, and then a constant voltage of 2.2 V was applied. The constant current-constant voltage discharging method described above was performed for 30 minutes. Then, the capacitor was charged at a constant current of 0.2 A till the cell voltage reached 3.6 V, whereby a charging characteristic with a low load was acquired. Then, the constant current-constant voltage discharging method was performed under the discharging condition same as that described above. The capacitor was repeatedly charged till the voltage reached 3.6V, while changing the current value. As a result, a charging load characteristic was acquired. The charging capacity and the discharging capacity with the low load were substantially equal to each other in all cells.

Figure 3:
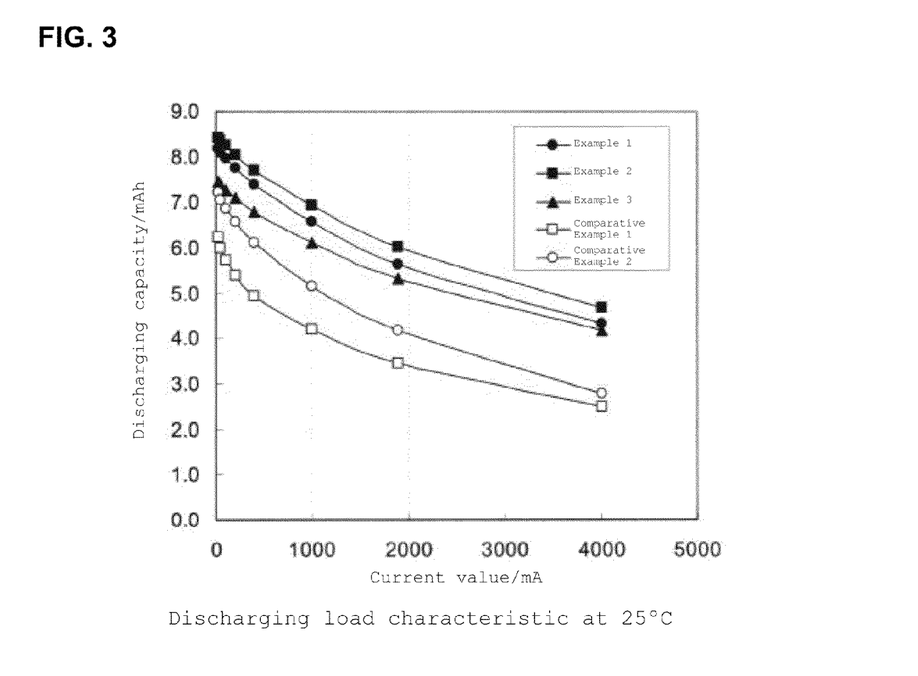
FIG. 3 is a graph illustrating a discharging load characteristic at 25° C.
Figure 4:
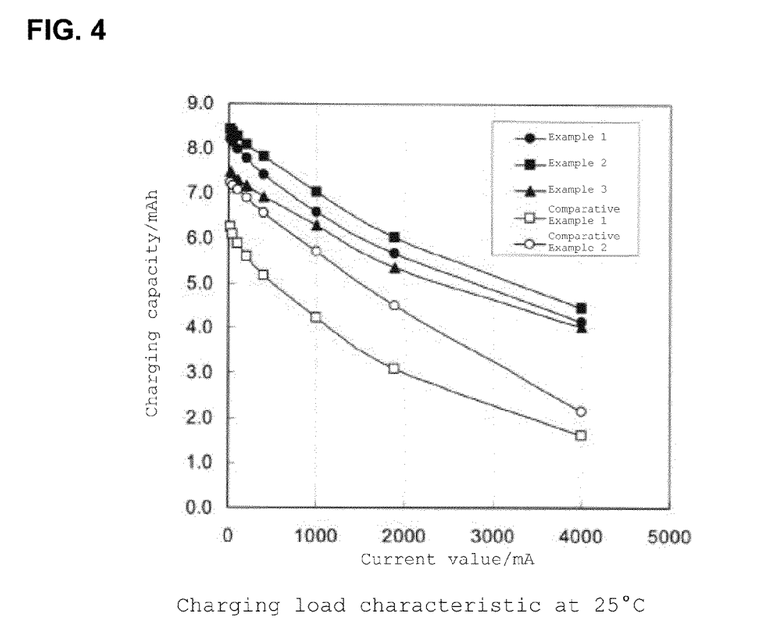
FIG. 4 is a graph illustrating a charging load characteristic at 25° C.

FIGS. 3 and 4 show the result of the discharging load characteristic and the charging load characteristic between the voltage of 3.6V to 2.2 V of the formed lithium ion capacitors.

Figure 5:
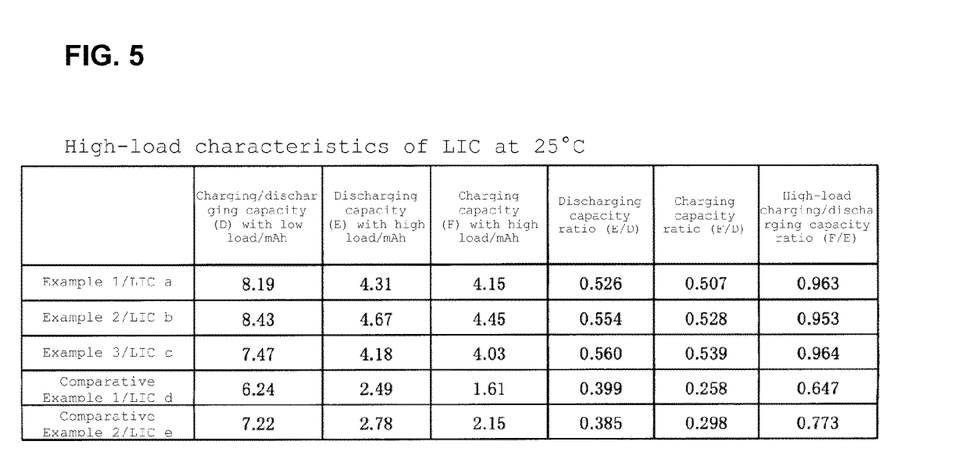
FIG. 5 is a table illustrating high-load characteristics of lithium ion capacitors described in the Examples.
Figure 6:
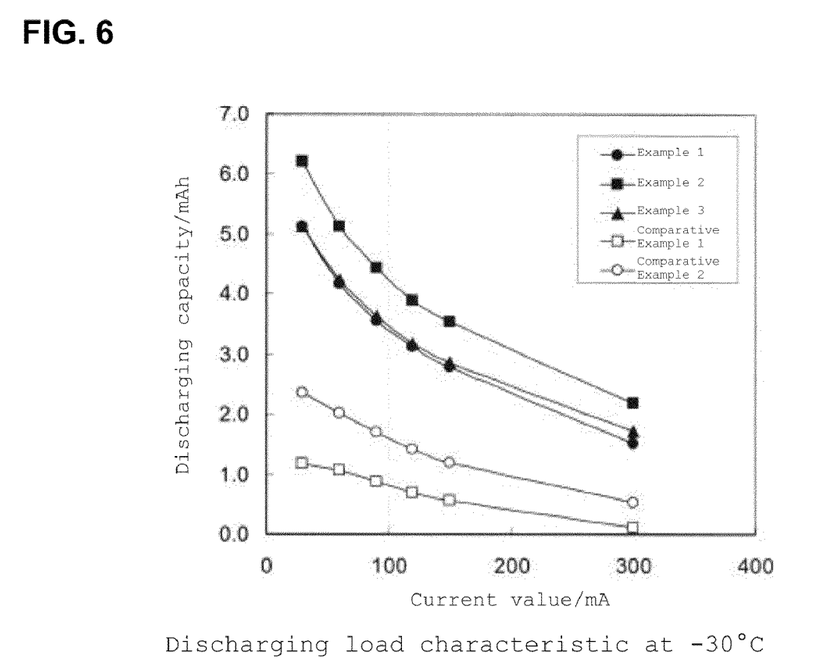
FIG. 6 is a graph illustrating a discharging load characteristic at −30° C.
Figure 7:
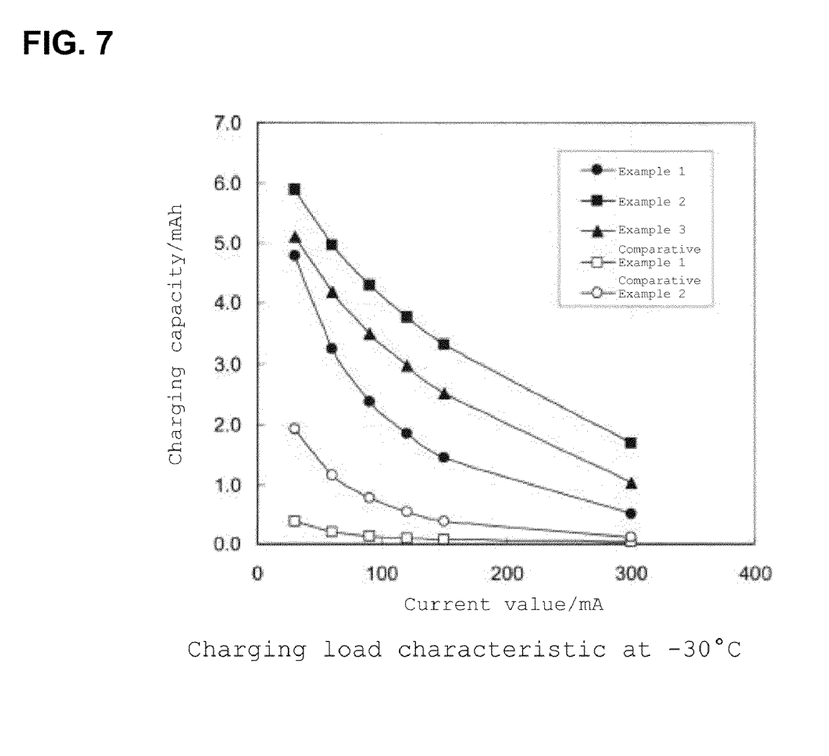
FIG. 7 is a graph illustrating a charging load characteristic at −30° C.

FIG. 5 shows the charging/discharging capacity (D) of each of the lithium ion capacitors when the capacitor is charged and discharged with a low load, the discharging capacity (E) of each of the lithium ion capacitors when it is discharged with a high load, the charging capacity (F) of each of the lithium ion capacitors when it is charged with a high load, the ratio (E/D) of the discharging capacity upon the high-load discharging to the discharging capacity upon the low-load discharging, the ratio (F/D) of the charging capacity upon the high-load charging to the charging capacity upon the low-load charging, and the ratio (F/E) of the charging capacity upon the high-load charging to the discharging capacity upon the high-load discharging.

As described above, the charging capacity with the low load and the discharging capacity with the low load were substantially equal to each other. Therefore, for the sake of convenience, the discharging capacity upon the low-load discharging and the charging capacity upon the low-load charging were collectively indicated as the charging/discharging capacity with the low load.

In FIG. 5, the greater capacity ratios E/D and F/D mean that the input/output density is excellent. The greater charging/discharging capacity ratio (F/E) with the high load means that the lithium ion capacitor is excellent in energy efficiency even in high power.

The experiment conducted by the present inventors for verifying the effect of the present invention has revealed that a lithium ion capacitor having excellent high-load characteristics can be obtained by allowing the pore volume ratio A to fall within the range of 0% or more and 80% or less and allowing the pore volume ratio B to fall within the range of 20% or more and 100% or less. According to the experiment, it was confirmed that a more satisfactory characteristic was obtained by allowing the pore volume ratio A to fall within the range of 0% or more and 70% or less and allowing the pore volume ratio B to fall within the range of 30% or more and 100% or less. In the present specification, FIGS. 3 to 5 show only some data pieces extracted from the experiment. The tendency described above can also be confirmed from some data pieces.

From the result shown in FIGS. 3 to 5, it is understood that a lithium ion capacitor having excellent high-load characteristic can be obtained by allowing the pore volume ratio A of the activated carbon, which is used for the positive electrode, to fall within the range of 0% or more and 80% or less or 0% or more and 70% or less, and allowing the pore volume ratio B to fall within the range of 20% or more and 100% or less or 30% or more and 100% or less. The Examples 1 to 3 illustrate the cases in which the value of A assumes 0.7, 0.6, and 0.5, respectively, from a great number of data pieces. Further, the Examples 1 to 3 illustrate the case in which the value of B assumes 0.2, 0.3, and 0.4 respectively from a great number of obtained data pieces.

The obtained result in this case shows that the lithium ion capacitor having the configuration of the Example 2, which is outside the scope of the claims in the Patent Document 1, has the most satisfactory characteristic. For example, the lithium ion capacitor in the Example 2 is more excellent than those in the Examples 1 and 3 in the charging/discharging capacity with the low load, the discharging capacity with the high load, and the charging capacity with the high load shown in FIG. 5. It is confirmed from this result that it is not always preferable the pore characteristic of the activated carbon used for the positive electrode active material falls within the range described in the claims in the Patent Document 1.

The discharging and charging load characteristics of the lithium ion capacitor under the environment of −30° C. were acquired in the same manner as in the condition of 25° C. FIGS. 6 to 9 show the result. The charging load characteristic under −30° C. was acquired as follows. Specifically, the voltage of the lithium ion capacitor was adjusted to 2.2 V at room temperature. This lithium ion capacitor was connected to a charging/discharging apparatus. With this state, the lithium ion capacitor was left for stand still in a thermostatic chamber, and the lithium ion capacitor was charged and discharged after a lapse of 3 hours or more after the displayed temperature of the thermostatic chamber reached −30° C. Thus, the test was started.

The discharging load characteristic at −30° C. was acquired as follows. Specifically, the lithium ion capacitor was charged at a constant current of 0.06 A till the cell voltage reached 3.6 V, and then a constant voltage of 3.6 V was applied. The constant current-constant voltage charging method described above was performed for 30 minutes. Then, the capacitor was repeatedly discharged till the voltage reached 2.2 V, while changing the current value. As a result, the discharging load characteristic was acquired. The current value was changed from 0.06 A to 0.3 A.

The charging load characteristic under −30° C. was acquired as follows. Specifically, the lithium ion capacitor was discharged at a constant current of 0.06 A till the cell voltage reached 2.2 V, and then a constant voltage of 2.2 V was applied. The constant current-constant voltage discharging method described above was performed for 30 minutes. Then, the capacitor was repeatedly charged till the voltage reached 3.6 V, while changing the current value. As a result, the charging load characteristic was acquired. The current value was changed from 0.06 A to 0.3 A.

Figure 8:
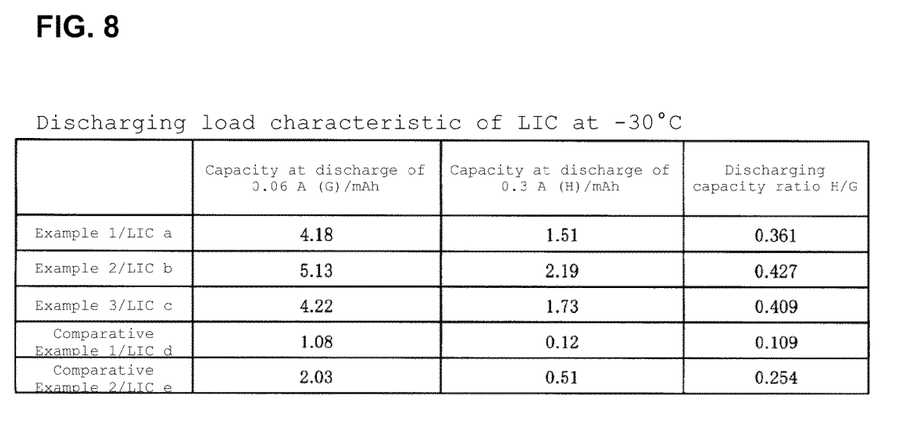
FIG. 8 is a table illustrating discharging load characteristics of lithium ion capacitors at −30° C. described in the Examples.
Figure 9:
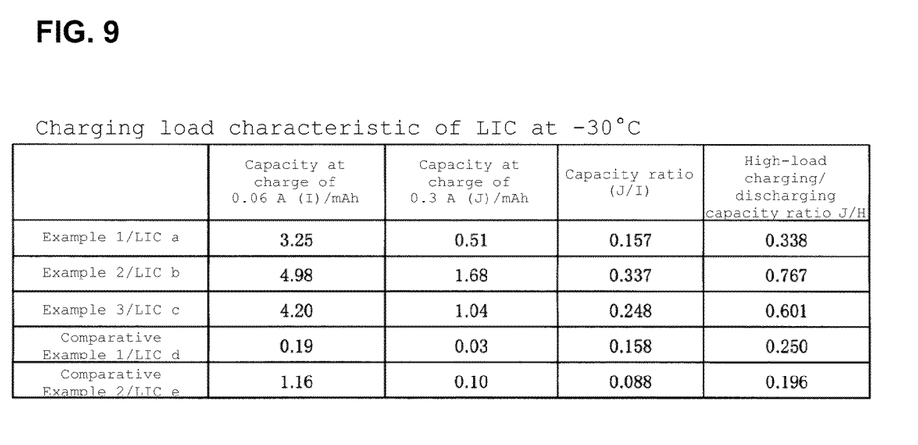
FIG. 9 is a table illustrating charging load characteristics of lithium ion capacitors at −30° C. described in the Examples.

In FIG. 8, the discharging capacity ratio (H/G) was obtained in which the discharging capacity upon the discharge at 0.06 A was defined as (G), and the discharging capacity upon the discharge at 0.3 A was defined as (H). In FIG. 9, the charging capacity ratio (J/I) was obtained in which the charging capacity upon the charge at 0.06 A was defined as (I), and the charging capacity upon the charge at 0.3 A was defined as (J). Further, the high-load charging/discharging capacity ratio (J/H) was obtained by using the discharging capacity in FIG. 8.

Like the characteristic under 25° C., it could be confirmed by the experiment that a lithium ion capacitor having excellent charging and discharging high-load characteristic and energy efficiency could be obtained by allowing the pore volume ratio A of the activated carbon, which was used for the positive electrode, to fall within the range of 0% or more and 80% or less and allowing the pore volume ratio B to fall within the range of 20% or more and 100% or less even under −30° C. It was also confirmed that a more satisfactory characteristic was obtained by allowing the pore volume ratio A to fall within the range of 0% or more and 70% or less and allowing the pore volume ratio B to fall within the range of 30% or more and 100% or less. In the present specification, FIGS. 6 to 9 show only some data pieces extracted from the experiment, like the case in FIGS. 3 to 5. The tendency described above can be confirmed from some data pieces.

It is particularly understood that a dramatic enhancement of the charging load characteristic could be attained. It is also understood that the characteristic is more enhanced by allowing the range of the pore volume ratio A and the range of the pore volume ratio B to be more strict. On the contrary, the cell in the Comparative Examples exhibited a remarkable reduction in the charging load characteristic when the ambient temperature was set to be −30° C.

In the lithium ion capacitor evaluated in this case, the activated carbon in the lithium ion capacitor b using the positive electrode active material in the Example 2 and exhibiting the most satisfactory characteristic has the range outside the range described in the claims of the Patent Document 1. This shows that it is not always necessary to enhance the input/output characteristic that the pore characteristic of the activated carbon, which is the positive electrode active material of the lithium ion capacitor, falls within the specified range.

The invention made by the present inventors has been specifically described above on the basis of the embodiments. The present invention is not limited to the aforesaid embodiments, and various modifications are possible without departing from the scope of the present invention.

INDUSTRIAL APPLICABILITY

The present invention is well adaptable to a field of a pre-dope type electric storage device.

What is claimed is:

1. A positive electrode active material for a lithium ion electric storage device,
    the active material having a BET specific surface area of 1500 m$^2$/g or more and 3000 m$^2$/g or less,
    wherein a ratio A of the pore volume within the range of the pore diameter of 0.6 nm or more and less than 1 nm to the pore volume within the range of the pore diameter of 0.6 nm or more and 200 nm or less in the active material satisfies 0.49≦A≦0.70, and
    a ratio B of the pore volume within the range of the pore diameter of 1 nm or more and 6 nm or less to the pore volume within the range of the pore diameter of 0.6 nm or more and 200 nm or less in the active material satisfies 0.20≦B≦0.38.

2. The positive electrode active material for a lithium ion electric storage device according to claim 1, wherein
    the pore volume B falls within 0.30≦B≦0.38.

3. The positive electrode active material for a lithium ion electric storage device according to claim 1, wherein the active material is an activated carbon.

4. A lithium ion electric storage device using the positive electrode active material for a lithium ion electric storage device according to claim 1.

5. The lithium ion electric storage device according to claim 4, wherein
    an electrolytic solution contains propylene carbonate.

* * * * *